US008227116B2

(12) United States Patent
Kawasaki et al.

(10) Patent No.: US 8,227,116 B2
(45) Date of Patent: *Jul. 24, 2012

(54) SECONDARY BATTERY (75) Inventors: Daisuke Kawasaki, Tokyo (JP); Yuki Kusachi, Tokyo (JP); Tatsuji Numata, Tokyo (JP); Koji Utsugi, Tokyo (JP)

(73) Assignee: NEC Corporation, Tokyo (JP)

(*) Notice: Subject to any disclaimer, the term of this patent is extended or adjusted under 35 U.S.C. 154(b) by 932 days.

This patent is subject to a terminal disclaimer.

(21) Appl. No.: 10/582,855

(22) PCT Filed: Dec. 14, 2004

(86) PCT No.: PCT/JP2004/018656
§ 371 (c)(1), (2), (4) Date: Jun. 14, 2006

(87) PCT Pub. No.: WO2005/057713
PCT Pub. Date: Jun. 23, 2005

(65) Prior Publication Data
US 2007/0154815 A1 Jul. 5, 2007

(30) Foreign Application Priority Data

Dec. 15, 2003 (JP) .................. 2003-416516
Oct. 29, 2004 (JP) .................. 2004-317282

(51) Int. Cl.
*H01M 6/16* (2006.01)
*H01M 6/04* (2006.01)
*H01M 4/13* (2010.01)
*H01M 4/50* (2010.01)
*H01M 4/58* (2010.01)

(52) U.S. Cl. ... 429/340; 429/199; 429/224; 429/231.95; 429/324; 429/327

(58) Field of Classification Search .................. 429/224, 429/231.95, 340, 199, 324, 327
See application file for complete search history.

(56) References Cited

U.S. PATENT DOCUMENTS

| 4,818,644 | A * | 4/1989 | Armand ............ 429/307 |
| 4,950,768 | A | 8/1990 | Cronyn |
| 5,795,674 | A * | 8/1998 | Shiota ............... 429/54 |
| 6,225,009 | B1 * | 5/2001 | Fleischer et al. ......... 429/306 |
| 6,436,582 | B1 | 8/2002 | Hamamoto et al. |
| 6,620,546 | B1 | 9/2003 | Michot et al. |
| 7,163,768 | B2 * | 1/2007 | Utsugi et al. ......... 429/340 |
| 7,482,302 | B2 | 1/2009 | Adachi et al. |
| 2002/0037458 | A1 * | 3/2002 | Yamaguchi et al. ....... 429/338 |
| 2003/0113621 | A1 | 6/2003 | Shimamura et al. |
| 2004/0043300 | A1 * | 3/2004 | Utsugi et al. ......... 429/329 |
| 2004/0214091 | A1 | 10/2004 | Lim et al. |

FOREIGN PATENT DOCUMENTS

| DE | EP 1 088 814 A1 * | 9/2000 |
| EP | 1 215 304 | 6/2002 |
| JP | 5-234583 | 9/1993 |
| JP | 5-275077 | 10/1993 |
| JP | 07-263378 | 10/1995 |
| JP | 7-302617 | 11/1995 |
| JP | 8-250108 | 9/1996 |
| JP | 9-245834 | 9/1997 |
| JP | 09-301981 | 11/1997 |
| JP | 10-189041 | 7/1998 |
| JP | 11-288706 | 10/1999 |
| JP | 2000-003724 | 1/2000 |
| JP | 2000-133304 | 5/2000 |
| JP | 2000-133305 | 5/2000 |
| JP | 2001-313071 | 11/2001 |
| JP | 2002-008718 | 1/2002 |
| JP | 2002-170564 | 6/2002 |
| JP | 2003-7334 | 1/2003 |
| JP | 2003-115324 | 4/2003 |
| JP | 2003-157900 | 5/2003 |
| JP | 2003-217654 | 7/2003 |
| JP | 2004-193408 | 7/2004 |
| KR | 2001-0067251 | 7/2001 |
| SU | 379659 | 1/1971 |
| SU | 644858 | 1/1979 |
| WO | 85/03075 | 7/1985 |
| WO | 2004/072021 | 8/2004 |
| WO | 2004/101860 | 11/2004 |

OTHER PUBLICATIONS

Machine translation of EP 1 088 814 A1, Sep. 2000.*
Bauer et al., "A Study of Methylenedisulfonic Acid and its Derivatives," J. Am. Pham. Assoc., vol. 126, pp. 485-493 (1937).
Biol. Aktiv. Soedin., pp. 64-69 (1968).
G. Schroeter, Lieb, Ann, Der Chemie, vol. 418, pp. 161-257 (1919).
Armyanskii Khimicheskii Zhurnal, 21, pp. 393-396 (1968).
US Office Action dated Jan. 5, 2012, U.S. Appl. No. 13/274,783.
Saltovskaya, L.A. et al.—Extraction of copper from secondary copper-containing oreS—SiFinder—SciFinder Citation for SU 644858 A2—Jan. 30, 1979.
U.S Official Action from corresponding U.S. Appl. No. 10/541,063—Nov. 14, 2011, Jun. 17, 2011, Apr. 25, 2011, Feb. 3, 2011, Aug. 11, 2010, Jul. 22, 2009 and Dec. 11, 2008.

* cited by examiner

*Primary Examiner* — Patrick Ryan
*Assistant Examiner* — Julian Anthony
(74) *Attorney, Agent, or Firm* — Young & Thompson (57) ABSTRACT

A lithium secondary battery which has excellent characteristics such as energy density and electromotive force and is excellent in cycle life and storage stability is provided. The secondary battery comprises a positive electrode, a negative electrode, and an electrolyte solution comprising an aprotic solvent having at least an electrolyte dissolved therein, wherein the positive electrode comprises a lithium-manganese composite oxide having a spinel structure as a positive electrode active material, and the electrolyte solution comprises a compound represented by the general formula (1).

19 Claims, 1 Drawing Sheet

SECONDARY BATTERY

TECHNICAL FIELD

The present invention relates to a secondary battery, and particularly to a laminate type secondary battery.

BACKGROUND OF THE INVENTION

A nonaqueous electrolyte solution lithium ion or lithium secondary battery using a carbon material or a lithium metal for a negative electrode and using a lithium-containing composite oxide for a positive electrode is given attention as an electric power supply for cellular phones, notebook computers and the like because a high energy density can be achieved. It is known that a film called a surface film, protective film, SEI or film is generally generated on the surface of the electrode in the secondary battery. It is known that control of the surface film is essential for improvement of the electrode because the surface film has significant influences on the charge and discharge efficiency, the cycle life and the safety. Namely, when a carbon material is used as a negative electrode material, it is necessary to reduce its irreversible capacity, and in the lithium metal negative electrode, it is necessary to solve the problem of reduction in charge and discharge efficiency and the problem as to safety due to generation of dendrite.

As methods for solving these problems, various methods have been proposed. For example, if a lithium metal is used as a negative electrode material, inhibiting generation of dendrite by providing a film layer made of lithium fluoride or the like on the surface of the negative electrode using a chemical reaction has been proposed.

Japanese Patent Laid-Open No. 7-302617 discloses a technique in which a lithium negative electrode is exposed to an electrolyte solution containing hydrofluoric acid and the negative electrode is made to react with hydrofluoric acid to cover its surface with lithium fluoride film. Hydrofluoric acid is generated by a reaction of $LiPF_6$ and a very small amount of water. On the other hand, on the surface of the lithium negative electrode, surface films of lithium hydroxide and lithium oxide are formed by natural oxidization in air. They react, whereby the surface film of lithium fluoride is generated on the surface of the negative electrode. However, this lithium fluoride film is formed using the reaction between an electrode interface and a liquid, side reaction components tend to be included in the surface film, and therefore there are cases where a uniform film cannot be obtained. Furthermore, there are cases where the surface films of lithium hydroxide and lithium oxide are not formed uniformly and an area on which lithium is partially exposed exists, and in these cases, a uniform thin film cannot be formed, and in addition, a problem as to safety due to a reaction between water, hydrogen fluoride, or the like and lithium arises. If the reaction is insufficient, unnecessary compound components other than fluorides may remain, causing adverse effects such as a reduction in ion conductivity. In such a method of forming a fluoride layer using a chemical reaction at an interface, there are cases where the range of choices of available fluorides and electrolyte solutions is limited and it is difficult to form a stable surface film in a high yield.

In Japanese Patent Laid-Open No. 8-250108, a mixed gas of argon and hydrogen fluoride is made to react with an aluminum-lithium alloy to obtain a surface film of lithium fluoride on the surface of a negative electrode. However, if a surface film already exists on the surface of a lithium metal, particularly a plurality of kinds of compounds exist, there are cases where the reaction tends to be uneven so that it is difficult to uniformly form a film of lithium fluoride. In this case, it is difficult to obtain a lithium secondary battery having sufficient cycle characteristics.

Japanese Patent Laid Open No. 11-288706 discloses a technique in which a surface film structure comprising a material having a rock salt crystalline structure as a main component is formed on the surface of a lithium sheet with a uniform crystalline structure, namely a (100) crystalline plane oriented preferentially. It is described that by doing so, a uniform deposition and dissolution reaction, namely charge and discharge of a battery, can be carried out, and dendrite deposition of a lithium metal can be inhibited to improve the cycle life of the battery. It is described that a material that is used for the surface film preferably has a halide of lithium, and a solid solution of at least one selected from a group consisting of LiCl, LiBr and LiI and LiF is used. Specifically, for forming a solid solution film of at least one selected from a group consisting of LiCl, LiBr and LiI and LiF, a lithium sheet fabricated by press processing (rolling) and having a (100) crystalline plane oriented preferentially is immersed in an electrolyte solution containing at least one selected from a group consisting of (1) chlorine molecules or chlorine ions, (2) bromine molecules or bromide ions and (3) iodine molecules or iodine ions, and fluorine molecules or fluorine ions, whereby a negative electrode for a nonaqueous electrolyte battery is fabricated. In this technique, a lithium metal sheet made by rolling is used, the lithium sheet is thus tends to be exposed in air so that films originating from water and the like tend to be formed on the surface, active points unevenly exist, and therefore there are cases where it is difficult to make a desired stable surface film, and in this case the effect of inhibiting dendrite is not necessarily sufficiently obtained.

It is reported techniques relating to improvements of the capacity and charge and discharge efficiency when using a carbon material such as graphite or hard carbon capable of occluding and releasing lithium ions as a negative electrode.

In Japanese Patent Laid-Open No. 5-234583, a negative electrode having a carbon material covered with aluminum is proposed. It is described that reduction decomposition of solvent molecules solvating with lithium ions on the carbon surface is thus inhibited to suppress a degradation in cycle life. However, there are cases where the capacity rapidly decreases when the cycle is repeated because aluminum reacts with a very small amount of water.

In Japanese Patent Laid-Open No. 5-275077, a negative electrode with the surface of a carbon material covered with a thin film of a lithium ion conductive solid electrolyte is presented. It is described that decomposition of a solvent occurring when using a carbon material is thus inhibited, and particularly, a lithium ion secondary battery using propylene carbonate can be provided. However, there are cases where cracks occurring in a solid electrolyte due to a change in stress during insertion and detachment of lithium ions lead to a degradation in characteristics. In addition, there are cases where due to unevenness such as crystal defects of the solid electrolyte, an even reaction is not obtained on the surface of the negative electrode, so that the cycle life is degraded.

Japanese Patent Laid-Open No. 2000-3724 discloses a secondary battery in which the negative electrode is composed of a material containing graphite, a cyclic carbonate and a chain carbonate are used as a main component for the electrolyte solution, and the aforementioned electrolyte solution contains 1,3-propane sultone and/or 1,4-butane sultone as a cyclic monosulfonate in an amount of 0.1 to 4% by weight. Here, 1,3-propane sultone and 1,4-butane sultone are considered to have an effect of contributing to formation of a passivation film on the surface of a carbon material, covering the carbon material highly crystallized by activities of natural graphite and artificial graphite with the passivation film, and inhibiting decomposition of the electrolyte solution without impairing a normal reaction of the battery. In Japanese Patent Laid-Open No. 2000-133304 and U.S. Pat. No. 6,436,582, it is reported that aside from the cyclic monosulfonate, a similar effect is obtained by use of a chain disulfonate. However, in the cyclic monosulfonate of Japanese Patent Laid-Open No. 2000-3724 or the chain disulfonate in Japanese Patent Laid-Open No. 2000-133304 and U.S. Pat. No. 6,436,582, there are cases where formation of a film on a negative electrode first occurs and it is difficult to form a film on, for example, a positive electrode. A method for producing a chain disulfonic acid is disclosed in J. Am. Pham. Assoc., vol. 126, pages 485-493 (1937), G. Schroeter, Lieb, Ann, Der Chemie, vol. 418, pages 161-257 (1919), Biol. Aktiv. Soedin., pp 64-69 (1968) and Armyanskii Khimicheskii Zhurnal, 21, pp 393-396 (1968), and a method for producing a cyclic sulfonate having two sulfonyl groups is disclosed in Japanese Patent Publication No. 5-44946 and U.S. Pat. No. 4,950,768.

In Japanese Patent Laid-Open No. 2003-7334, oxidation of an electrolyte solution solvent is prevented by adding an aromatic compound to the electrolyte solution solvent to inhibit degradation in capacity when repeating charge and discharge of a secondary battery over a long time period. This is a technique for preventing decomposition of a solvent by preferentially oxidizing and decomposing the aforementioned aromatic compound. However, there are cases where when this additive used, the effect of improving the cyclic characteristic cannot be sufficient because the surface of the positive electrode is not covered.

Japanese Patent Laid-Open No. 2003-115324 describes a technique in which the cycle characteristic is improved by adding a nitrogen-containing unsaturated cyclic compound in an electrolyte solution when using a high-voltage positive electrode. However, the nitrogen-containing unsaturated cyclic compound improves the charge and discharge efficiency of the negative electrode, but does not improve the charge and discharge efficiency of the positive electrode.

A lithium-manganese composite oxide having a spinel structure as described in Japanese Patent No. 2996234, Japanese Patent No. 3024636 and Japanese Patent No. 3120789 has been developed as a material that is advantageous for a high-capacity secondary battery because of the high electric potential and inexpensiveness. However, this material is known to cause degradation in capacity resulting from elution of manganese, and various studies have been conducted. For example, Japanese Patent No. 2996234, Japanese Patent No. 3024636 and Japanese Patent No. 3120789 disclose a technique in which hydrogen ions that can be considered to be one of causes of elution of manganese are trapped by a lithium-nickel composite oxide mixed in the positive electrode to inhibit elution of manganese.

SUMMARY OF THE INVENTION

The conventional techniques described above have the following common problems. The surface film generated on the surface of an electrode is closely related to the charge and discharge efficiency, the cycle life and the safety depending on its nature, but in the conventional techniques described above, a stable film is formed mainly on a negative electrode, and a technique for forming films on both negative and positive electrodes is not disclosed.

In the conventional technique for forming a film on the positive electrode, a method capable of controlling the film over a long time period is not present. Thus, the effect of inhibiting dendrite is obtained to a certain extent during initial usage, but there are cases where the surface film is deteriorated and its function as a protective film is degraded when used repeatedly. It is conceivable that this is because a layer of a positive electrode active material containing lithium has its volume changed by occluding and releasing lithium, while the film formed on the surface has little change in volume, and resultantly, internal stresses occur in the layers and the interface between the layers. It is conceivable that a part of the surface film is damaged due to occurrence of such internal stresses to degrade a function of inhibiting dendrite. As a result, an electrolyte solution is decomposed, and it is thus difficult to maintain a high discharge capacity and excellent cycle characteristics.

Particularly, when a lithium-manganese composite oxide having a spinel structure, which can be expected to provide a high operating voltage as a positive electrode active material, is used, elusion of manganese into an electrolyte solution occurs due to an increase in hydrogen ion concentration in the electrolyte solution. As a result, decomposition of the electrolyte solution on the surface of the electrode and decomposition of the electrolyte solution by manganese eluted into the electrolyte solution occur, leading to a considerable degradation in discharge capacity and cycle characteristic.

The present invention has been made in view of the situations described above, and its object is to obtain a secondary battery having an excellent discharge capacity and cycle characteristic by forming a stable and uniform film on the surface of a positive electrode by including a lithium-manganese composite oxide having a spinel structure in a positive electrode and adding a chain disulfonic acid compound in the electrolyte solution, inhibiting elution of manganese into an electrolyte solution and preventing decomposition of the electrolyte solution.

For solving the problems described above, the present invention has the following configuration. That is, the present invention relates to a secondary battery comprising:

a positive electrode;

a negative electrode; and an electrolyte solution comprising an aprotic solvent having at least an electrolyte dissolved therein, wherein the positive electrode comprises a lithium-manganese composite oxide having a spinel structure as a positive electrode active material, and the electrolyte solution comprises a compound represented by the general formula (1):

[Formula 1]

(1)

wherein $R_1$ and $R_4$ independently represent an atom or a group selected from a hydrogen atom, a substituted or unsubstituted alkyl group having 1 to 5 carbon atoms, a substituted or unsubstituted alkoxy group having 1 to 5 carbon atoms, a substituted or unsubstituted fluoroalkyl group having 1 to 5 carbon atoms, a polyfluoroalkyl group having 1 to 5 carbon atoms, —$SO_2X_1$, wherein $X_1$ is a substituted or unsubstituted alkyl group having 1 to 5 carbon atoms, —$SY_1$, wherein $Y_1$ is a substituted or unsubstituted alkyl group having 1 to 5 carbon atoms, —COZ, wherein Z is a hydrogen atom or a substituted or unsubstituted alkyl group having 1 to 5 carbon atoms, and a halogen atom; and $R_2$ and $R_3$ independently represent an atom or a group selected from a substituted or unsubstituted alkyl group having 1 to 5 carbon atoms, a substituted or unsubstituted alkoxy group having 1 to 5 carbon atoms, a substituted or unsubstituted phenoxy group, a substituted or unsubstituted fluoroalkyl group having 1 to 5 carbon atoms, a polyfluoroalkyl group having 1 to 5 carbon atoms, a substituted or unsubstituted fluoroalkoxy group having 1 to 5 carbon atoms, a polyfluoroalkoxy group having 1 to 5 carbon atoms, a hydroxyl group, a halogen atom, —$NX_2X_3$, wherein $X_2$ and $X_3$ independently represent a hydrogen atom or a substituted or unsubstituted alkyl group having 1 to 5 carbon atoms, and —$NY_2CONY_3Y_4$, wherein $Y_2$ to $Y_4$ independently represent a hydrogen atom or a substituted or unsubstituted alkyl group having 1 to 5 carbon atoms.

Further, in the present invention, it is preferable that the lithium-manganese composite oxide having a spinel structure is $Li(M_xMn_{1-x})_2(O_{1-y}F_y)_4$ ($0 \leq x \leq 0.118$ and $0 \leq y \leq 0.1$), wherein M is at least one element selected from the group consisting of Li, B, Na, Mg, Al, Si, S, K, Ca, Sc, Ti, V, Cr, Fe, Co, Ni, Cu, Zn, Ga, Sr, Y, Zr, Nb, In, Sn, Ba, La, Ce, Nd, Sm, Ta and Pb.

Further, in the present invention, it is preferable that the electrolyte solution has a composition that can produce hydrogen ions by reacting with water, and a hydrogen ion scavenger is placed at a location in contact with the electrolyte solution in the secondary battery.

Further, in the present invention, it is preferable that the hydrogen ion scavenger is a lithium-nickel composite oxide having a hydrogen ion scavenging function, and is mixed with the positive electrode.

Further, in the present invention, it is preferable that the lithium-nickel composite oxide having a hydrogen ion scavenging function has a specific surface area $X_a$ (m²/g) of $0.1 \leq X_a \leq 3.0$.

Further, in the present invention, it is preferable that the lithium-nickel composite oxide having a hydrogen ion scavenging function has a $D_{50}$ particle diameter of 1 μm to 40 μm.

Further, in the present invention, it is preferable that a is $3 < a \leq 45$ when a weight ratio of the lithium-manganese composite oxide having a spinel structure to the lithium-nickel composite oxide is represented by [lithium-manganese composite oxide having a spinel structure]:[lithium-nickel composite oxide]=(100−a):a.

Further, in the present invention, it is preferable that the positive electrode is further mixed with $Li(Ni_bCo_cMn_{1-b-c})O_2$, wherein b is $0 \leq b \leq 2/3$ and c is $0 \leq c \leq 2/3$, provided that $b+c \leq 2/3$).

Further, in the present invention, it is preferable that d is $3 < d \leq 45$ when a weight ratio of the lithium-manganese composite oxide having a spinel structure to the $Li(Ni_bCo_cMn_{1-b-c})O_2$ is represented by [lithium-manganese composite oxide having a spinel structure]:[$Li(Ni_bCo_cMn_{1-b-c})O_2$]= (100−d):d.

Further, in the present invention, it is preferable that there is a bismuth compound on or near the surface of the lithium-manganese composite oxide having a spinel structure.

Further, in the present invention, it is preferable that the bismuth compound is a bismuth oxide or a composite oxide of bismuth and manganese.

Further, in the present invention, it is preferable that the compound represented by the general formula (1) is contained in the electrolyte solution in an amount of 0.1 to 5.0% by weight based on the total weight of the electrolyte solution.

Further, in the present invention, it is preferable that the electrolyte solution further comprises a cyclic monosulfonate represented by the general formula (2):

[Formula 2]

(2)

wherein n is an integer of 0 to 2; $R_5$ to $R_{10}$ independently represent an atom or a group selected from a hydrogen atom, a substituted or unsubstituted alkyl group having 1 to 12 carbon atoms, a substituted or unsubstituted fluoroalkyl group having 1 to 6 carbon atoms, and a polyfluoroalkyl group having 1 to 6 carbon atoms.

Further, in the present invention, it is preferable that the electrolyte solution further comprises a cyclic sulfonate having two sulfonyl groups represented by the general formula (3):

[Formula 3]

(3)

wherein Q represents an oxygen atom, a methylene group or a single bond, and A represents a group selected from a substituted or unsubstituted alkylene group having 1 to 5 carbon atoms, a carbonyl group, a sulfinyl group, a polyfluoroalkylene group having 1 to 5 carbon atoms, a substituted or unsubstituted fluoroalkylene group having 1 to 5 carbon atoms, a substituted or unsubstituted alkylene group having 1 to 5 carbon atoms in which at least one C—C bond is replaced by a C—O—C bond, a polyfluoroalkylene group having 1 to 5 carbon atoms in which at least one C—C bond is replaced by a C—O—C bond, and a substituted or unsubstituted fluoroalkylene group having 1 to 5 carbon atoms in which at least one C—C bond is replaced by a C—O—C bond; and B represents a group selected from a substituted or unsubstituted alkylene group having 1 to 5 carbon atoms, a polyfluoroalkylene group having 1 to 5 carbon atoms, and a substituted or unsubstituted fluoroalkylene group having 1 to 5 carbon atoms.

Further, in the present invention, it is preferable that the electrolyte solution further comprises at least one of vinylene carbonates and derivatives thereof.

Further, in the present invention, it is preferable that the electrolyte comprises a lithium salt., and the lithium salt is at least one lithium salt selected from the group consisting of $LiPF_6$, $LiBF_4$, $LiAsF_6$, $LiSbF_6$, $LiClO_4$, $LiAlCl_4$ and $LiN(C_kF_{2k+1}SO_2)(C_mF_{2m+1}SO_2)$, wherein k and m are independently 1 or 2.

Further, in the present invention, it is preferable that the aprotic solvent is at least one organic solvent selected from the group consisting of cyclic carbonates, chain carbonates, aliphatic carboxylates, γ-lactones, cyclic ethers, chain ethers and fluorinated derivatives thereof.

In the present invention, further, it is preferable that the secondary battery is covered with a laminated exterior package.

In this specification, the "polyfluoroalkylene group", "polyfluoroalkyl group" and "polyfluoroalkoxy group" refer to groups in which hydrogen atoms bound to carbon atoms of the corresponding alkylene group, alkyl group and alkoxy group, respectively, are all substituted with fluorine atoms, and the "fluoroalkylene group", "fluoroalkyl group" and "fluoroalkoxy group" refer to groups in which part of hydrogen atoms bound to carbon atoms of the corresponding alkylene group, alkyl group and alkoxy group, respectively, are substituted by fluorine atoms.

The term "substituted" in the "substituted fluoroalkylene group", "substituted fluoroalkyl group" and "substituted fluoroalkoxy group" means that at least one of hydrogen atoms bound to carbon atoms is substituted with an atom or a functional group other than fluorine. The atom or the functional group other than fluorine may be, for example, a halogen atom such as a chlorine atom, a bromine atom or an iodine atom, a hydroxyl group, a alkoxy group having 1 to 5 carbon atoms, a group with the alkoxy group substituted with a halogen atom, a hydroxyl group or the like, a group with —$SO_2$— introduced in these alkoxy groups (e.g. —$OSO_2CH_2SO_2Cl$) or the like. If the functional group contains a carbon atom, this carbon atom is not included in "1 to 5 carbon atoms" in the description of "substituted or unsubstituted alkyl groups having 1 to 5 carbon atoms" and the like.

According to the present invention, by using an electrolyte solution for a secondary battery including a lithium-manganese composite oxide having a spinel structure in a positive electrode and comprising a chain disulfone compound, a film is formed on the surface of an electrode to prevent elution of manganese into the electrolyte solution, thus making it possible to inhibit decomposition of the electrolyte solution. As a result, an excellent lithium secondary battery having excellent charge and discharge efficiency, a good cycle characteristic and a high capacity maintenance rate and allowing inhibition of an increase in resistance during storage can be obtained.

According to the present invention, further, by placing a hydrogen ion scavenger in an area of a positive electrode which is in contact with an electrolyte solution, elution of manganese into the electrolyte solution can more effectively be inhibited in corporation with the film formed on the surface of the positive electrode. As a result, a secondary battery having a more excellent cycle characteristic and capacity maintenance rate can be obtained.

11 positive electrode current collector
12 layer containing positive electrode active material
13 layer containing negative electrode active material
14 negative electrode current collector
15 nonaqueous electrolyte solution
16 porous separator

DETAILED DESCRIPTION OF THE INVENTION (Secondary Battery)

Figure 1:
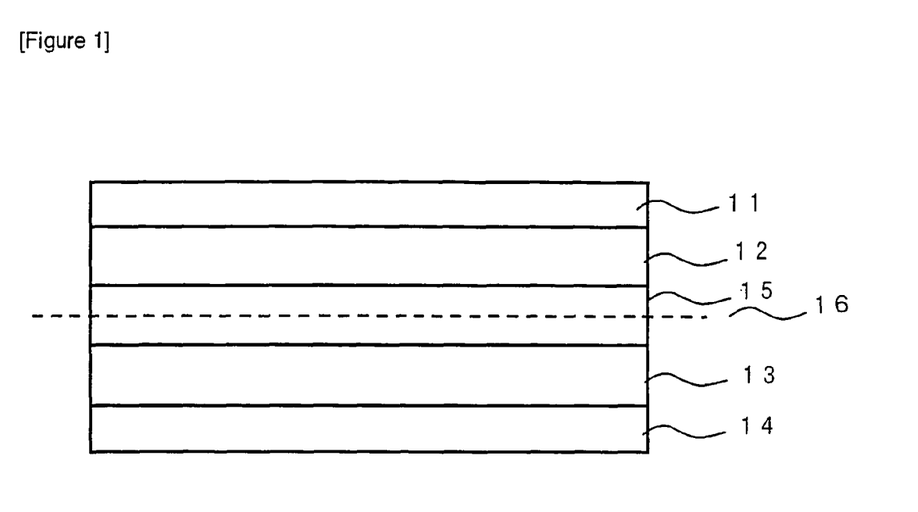
FIG. 1 is a schematic block diagram of a secondary battery according to the present invention.

A general structure for one example of a battery according to the present invention is shown in FIG. 1. The secondary battery of FIG. 1 is composed of a positive electrode current collector 11, a layer 12 containing a positive electrode active material which can occlude and release lithium ions, a layer 13 containing a negative electrode active material which can occlude and release lithium ions, a negative electrode current collector 14, an electrolyte solution 15, and a separator 16 including the electrolyte solution.

(Current Collector)

For the positive electrode current collector 11, aluminum, stainless steel, nickel, titanium or an alloy thereof can be used, and for the negative electrode current collector 14, copper, stainless steel, nickel, titanium or an alloy thereof can be used.

(Separator)

For the separator 16, a polyolefin such as polypropylene or polyethylene, or a porous film such as a fluororesin is suitably used.

(Negative Electrode)

The negative electrode active material is composed of a material that can occlude and release lithium, such as a lithium metal or a carbon material. For the carbon material, graphite, amorphous carbon, diamond carbon, fullerene, a carbon nanotube, a carbon nanohone or the like which occludes lithium, or a composite thereof can be used. If a lithium metal is used as a negative electrode active material, the layer 13 as a negative electrode can be obtained by an appropriate method such as a melt liquid cooling method, a liquid rapid cooling method, an atomization method, a vacuum vapor deposition method, a sputtering method, a plasma CVD method, a photo CVD method, a thermal CVD method or a sol-gel method. In the case of the carbon material, the layer 13 as a negative electrode can be obtained by a method in which carbon and a binder such as polyvinylidene fluoride (PVDF) are mixed together, the resultant mixture is dispersed and kneaded in a solvent such as NMP, and the resultant mixture is coated on a base such as a copper foil, or a method such as vapor deposition method, a CVD method or a sputtering method.

(Positive Electrode)

For the positive electrode active material, a lithium-manganese composite oxide having a spinel structure is used. Specifically, $Li(M_xMn_{1-x})_2(O_{1-y}F_y)_4$ ($0 \leq x \leq 0.118$ and $0 \leq y \leq 0.1$), wherein M is at least one element selected from the group consisting of Li, B, Na, Mg, Al, Si, S, K, Ca, Sc, Ti, V, Cr, Fe, Co, Ni, Cu, Zn, Ga, Sr, Y, Zr, Nb, In, Sn, Ba, La, Ce, Nd, Sm, Ta and Pb, is preferably used. Among them, $Li(Li_{0.08}Mn_{0.92})_2O_4$ is especially preferably used. By using these materials in conjunction with an additive represented by the general formula (1), an increase in resistance after storage, a degradation in recovery capacity after storage and degradation in cycle characteristics can effectively be inhibited. It is conceivable that this is because a stable film is formed on the surface of the electrode due to interaction between these materials and the additive represented by the general formula (1), thus making it possible to effectively inhibit elution of manganese.

By further mixing a lithium-nickel composite oxide as a hydrogen ion scavenger in the positive electrode, in addition to those materials, elution of manganese can more effectively be inhibited. It is conceivable that this is because the lithium-nickel composite oxide traps hydrogen ions considered as one of causes of elution of manganese to inhibit elution of manganese in corporation with a film formed by the additive.

Further, it is conceivable that this is because an increase in pH of the electrolyte solution can be inhibited, thus making it possible to prevent adverse effects by hydrogen ions on the film. For the hydrogen ion scavenger, $LiNi_{0.8}Co_{0.2}O_2$ is preferably used.

For the lithium-nickel composite oxide having such a hydrogen ion trapping effect, a lithium-nickel composite oxide of which the specific surface area $X_a$ (m$^2$/g) is $0.1 \leq X_a \leq 3.0$ or the $D_{50}$ particle diameter is in the range of 10 to 40 μm is suitably used. The specific surface area $X_a$ (m$^2$/g) is measured by a BET-type surface area measuring apparatus.

Here, it is preferable that a is $3 < a \leq 45$ when the weight ratio of the lithium-manganese composite oxide having a spinel structure as a positive electrode active material to the lithium-nickel composite oxide is represented by [lithium-manganese composite oxide having a spinel structure]:[lithium-nickel composite oxide]=(100−a):a, since the hydrogen ion trapping effect is most sufficiently exhibited.

When $Li(Ni_bCo_cMn_{1-b-c})O_2$ (wherein b is $0 \leq b \leq 2/3$ and c is $0 \leq c \leq 2/3$, provided that $b+c \leq 2/3$) is mixed in the positive electrode, an improvement in capacity can be expected as compared to a case where the conventional lithium-manganese composite oxide having a spinel structure is used alone. It is conceivable that this is because the active material capacity essentially possessed by $Li(Ni_bCo_cMn_{1-b-c})O_2$ is high (for $Li(Ni_bCo_cMn_{1-b-c})O_2$, the capacity is 160 mAh/g or more at an upper limit voltage of 4.3 V when the Li metal is a negative electrode; and for the lithium-manganese composite oxide having a spinel structure, the theoretical limit value is 148 mAh/g at a lower limit voltage of 3.0 V and an upper limit voltage of 4.3 V when the Li metal is a negative electrode). In this case, d is $3 < d \leq 45$ when the weight ratio of the lithium-manganese composite oxide as a positive electrode active material to $Li(Ni_bCo_cMn_{1-b-c})O_2$ is represented by [lithium-manganese composite oxide]:[$Li(Ni_bCo_cMn_{1-b-c})O_2$]=(100−d):d, an improvement in capacity can be achieved most stably.

Figure 2:
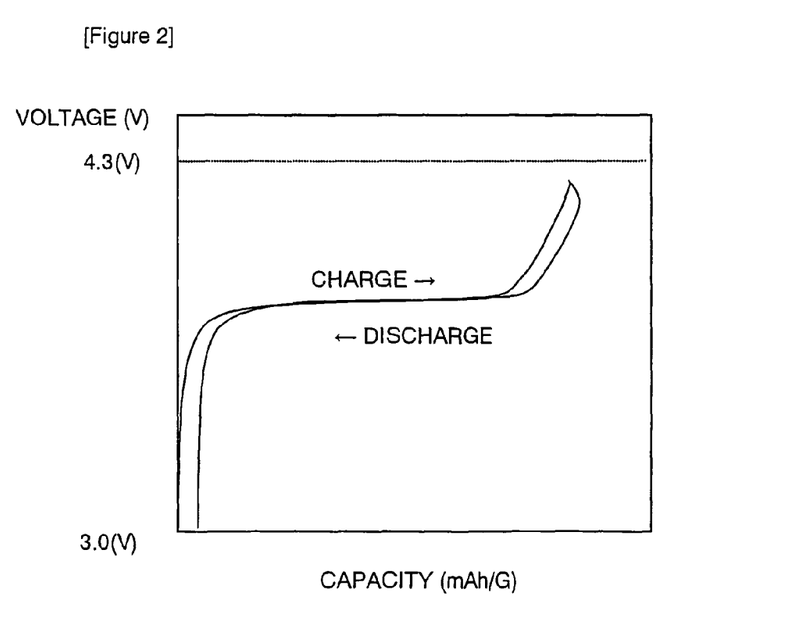
FIG. 2 is a view for explaining an electric potential flat part of the present invention.

The material (positive electrode active material) which is used in this specification can be expressed as a material having no charge and discharge region at 4.3 V or more, among lithium-manganese composite oxides having a spinel structure. FIG. 2 shows one example of a charge and discharge test conducted at a charge current rate of 1/40 C using the lithium-manganese composite oxide of the present invention as a positive electrode active material, using metal lithium as a negative electrode, and using as an electrolyte solution EC/DEC=30/70 (volume ratio) containing 1 mol/L of $LiPF_6$ as an electrolyte. In the present invention, the description of "having no charge and discharge region at 4.3 V or more" means that when such a charge and discharge test is conducted, stable charge and discharge can be conducted only in a charge and discharge region of a voltage that is less than 4.3 V as shown in FIG. 2.

For the positive electrode active material of the present invention, for example, a material having no charge and discharge region at 4.2 V or more (having a charge and discharge region only at a voltage that is less than 4.2 V) or a material having no charge and discharge region at 4.1 V or more (having a charge and discharge region only at a voltage that is less than 4.1 V) can be used. Typically, a material which can stably perform charge and discharge in a charge and discharge region of 4.0 V may be used. By performing charge and discharge using a positive electrode active material having a charge and discharge region within the aforementioned range, the stability of a film can further be improved to obtain a secondary battery having an excellent cycle characteristic.

Further, by having a bismuth compound such as, for example, a bismuth oxide or a bismuth-manganese composite oxide on or near the surface of the lithium-manganese composite oxide having a spinel structure, eluted manganese can be precipitated on the positive electrode, and therefore an effect of further improving the cycle characteristic can be expected. As a bismuth compound, $Bi_2O_3$, $BiMnO_3$ or the like can be used. These bismuth compounds can effectively react with manganese eluted in the electrolyte solution to precipitate manganese on the positive electrode.

The layer 12 as a positive electrode can be obtained by a method in which a selected positive electrode active material is used, the positive electrode active material is dispersed and kneaded in a solvent such as N-methyl-2-pyrolidone (NMP) together with an electric conductive material such as carbon black and a binder such as polyvinylidene fluoride (PVDF), and the resultant mixture is coated on a base such as an aluminum foil.

(Electrolyte Solution)

The electrolyte solution 15 has at least an electrolyte, an aprotic solvent and an additive.

(Electrolyte)

For the electrolyte, a lithium salt is used in the case of a lithium secondary battery, and the lithium salt is dissolved in an aprotic solvent. Lithium salts include lithium imide salts, $LiPF_6$, $LiAsF_6$, $LiAlCl_4$, $LiCLO_4$, $LiBF_4$ and $LiSbF_6$. Among them, $LiPF_6$ and $LiBF_4$ are especially preferable. Lithium imide salts include $LiN(C_kF_{2k+1}SO_2)(C_mF_{2m+1}SO_2)$ (wherein k and m are each independently 1 or 2). They may be used alone or in combination of two or more types. By including these lithium salts, a high energy density can be achieved.

(Aprotic Solvent)

For the aprotic electrolyte solution, at least one organic solvent selected from organic solvents of cyclic carbonates, chain carbonates, aliphatic carboxylates, γ-lactones, cyclic ethers, chain ethers and fluorinated derivatives thereof is used. More specifically, one or more of the following organic solvents can be used:

cyclic carbonates: propylene carbonate (hereinafter abbreviated as PC), ethylene carbonate (hereinafter referred to as EC), butylenes carbonate (BC) and derivatives thereof;

chain carbonates: dimethyl carbonate (DMC), diethyl carbonate (hereinafter abbreviated as DEC), ethyl methyl carbonate (EMC), dipropyl carbonate (DPC) and derivatives thereof;

aliphatic carboxylates: methyl formate, methyl acetate, ethyl propionate and derivatives thereof;

γ-lactones: γ-butyrolactone and derivatives thereof;

cyclic ethers: tetrahydrofuran, 2-methyltetrahydrofuran and derivatives thereof;

chain ethers: 1,2-diethoxyethane (DEE),ethoxymethoxyethane (EME), diethyl ether and derivatives thereof; and others: dimethyl sulfoxide, 1-3-dioxolane, formamide, acetamide, dimethyl formamide, acetonitrile, propionitrile, nitromethane, ethyl monoglime, phosphoric triester, trimethoxymethane, dioxolane derivatives, methyl sulfolane, 1,3-dimethyl-2-imidazolidinone, 3-methyl-2-oxazolidinone, anisole, N-methylpyrolidone and fluorinated carboxylates.

(Additive)

For the additive, a chain disulfonate represented by the general formula (1) is used.

[Formula 4]

(1)

wherein $R_1$ and $R_4$ independently represent an atom or a group selected from a hydrogen atom, a substituted or unsubstituted alkyl group having 1 to 5 carbon atoms, a substituted or unsubstituted alkoxy group having 1 to 5 carbon atoms, a substituted or unsubstituted fluoroalkyl group having 1 to 5 carbon atoms, a polyfluoroalkyl group having 1 to 5 carbon atoms, —$SO_2X_1$, wherein $X_1$ is a substituted or unsubstituted alkyl group having 1 to 5 carbon atoms, —$SY_1$, wherein $Y_1$ is a substituted or unsubstituted alkyl group having 1 to 5 carbon atoms, —COZ, wherein Z is a hydrogen atom or a substituted or unsubstituted alkyl group having 1 to 5 carbon atoms, and a halogen atom; and $R_2$ and $R_3$ independently represent an atom or a group selected from a substituted or unsubstituted alkyl group having 1 to 5 carbon atoms, a substituted or unsubstituted alkoxy group having 1 to 5 carbon atoms, a substituted or unsubstituted phenoxy group, a substituted or unsubstituted fluoroalkyl group having 1 to 5 carbon atoms, a polyfluoroalkyl group having 1 to 5 carbon atoms, a substituted or unsubstituted fluoroalkoxy group having 1 to 5 carbon atoms, a polyfluoroalkoxy group having 1 to 5 carbon atoms, a hydroxyl group, a halogen atom, —$NX_2X_3$, wherein $X_2$ and $X_3$ independently represent a hydrogen atom or a substituted or unsubstituted alkyl group having 1 to 5 carbon atoms, and —$NY_2CONY_3Y_4$, wherein $Y_2$ to $Y_4$ independently represent a hydrogen atom or a substituted or unsubstituted alkyl group having 1 to 5 carbon atoms.

The compound represented by the general formula (1) is an acyclic compound, involves no cyclization reaction during synthesis, and can be synthesized using the method described in, for example, J. Am. Pham. Assoc., vol. 126, pages 485-493 (1937), G. Schroeter, Lieb, Ann, Der Chemie, vol. 418, pages 161-257 (1919), Biol. Aktiv. Soedin., pp 64-69 (1968) and Armyanskii Khimicheskii Zhurnal, 21, pp 393-396 (1968). The compound can also be obtained as a byproduct from synthesis of the cyclic sulfonate having two sulfonyl groups, shown in Japanese Patent Publication No. 5-44946. Thus, the compound represented by the general formula (1) has an advantage that an inexpensive electrolyte solution can be provided, since the step of synthesis is simple.

Preferable molecular structures of $R_1$ and $R_4$ of the general formula (1) are preferably each independently an atom or a group selected from a hydrogen atom, alkyl groups having 1 to 5 carbon atoms, halogen atoms and —$SO_2X_1$ ($X_1$ is a substituted or unsubstituted alkyl group having 1 to 5 carbon atoms), more preferably each independently a hydrogen atom or an unsubstituted alkyl group having 1 to 5 carbon atoms, further preferably a hydrogen atom or a methyl group, in terms of ease of formation of a reactive film occurring on an electrode, stability of a compound, ease of handling, solubility in a solvent, ease of synthesis of a compound, a price and the like. For especially preferable forms of $R_1$ and $R_4$, $R_1$ and $R_4$ are hydrogen atoms. This is because when $R_1$ and $R_4$ are hydrogen atoms, a methylene site sandwiched between two sulfonyl groups is activated to facilitate formation of the reactive film on the electrode.

$R_2$ and $R_3$ are preferably each independently an atom or a group selected from a substituted or unsubstituted alkyl group having 1 to 5 carbon atoms, a substituted or unsubstituted alkoxy group having 1 to 5 carbon atoms, a substituted or unsubstituted phenoxy group, a hydroxyl group, a halogen atom and —$NX_2X_3$ (wherein $X_2$ and $X_3$ are each independently a hydrogen atom, or a substituted or unsubstituted alkyl group having 1 to 5 carbon atoms), more preferably each independently a substituted or unsubstituted alkyl group having 1 to 5 carbon atoms, or a substituted or unsubstituted alkoxy group having 1 to 5 carbon atoms, and further preferably, one or the other of or both of $R_2$ and $R_3$ are a substituted or unsubstituted alkoxy group having 1 to 5 carbon atoms, in terms of stability of a compound, ease of synthesis of a compound, solubility in a solvent, a price and the like. For the same reason, the aforementioned substituted or unsubstituted alkyl group having 1 to 5 carbon atoms is preferably a methyl group or an ethyl group, and the aforementioned substituted or unsubstituted alkoxy group having 1 to 5 carbon atoms is preferably a methoxy group or an ethoxy group.

The compound of general formula (1) has two sulfonyl groups, has small LUMO, and is easily reduced because the value of LUMO is smaller than those of a solvent molecule and a monosulfonate in the electrolyte solution. For example, the LUMO of the compound No. 1 shown in the Table 1 described below is as small as −0.86 eV according to semiempirical molecular orbital calculation. It is conceivable that a reduction film of the compound No. 1 is thus formed on the negative electrode prior to a solvent (LUMO: about 1.2 eV) composed of a cyclic carbonate or a chain carbonate, and plays a role of inhibiting decomposition of solvent molecules. Since decomposition of solvent molecules is inhibited, a decomposition film of high-resistance solvent molecules becomes hard to be formed on the negative electrode, and therefore inhibition of an increase in resistance and an improvement in cycle characteristic can be expected. Two electron-withdrawing sulfonyl groups are bound to a carbon atom, and it is conceivable that a film is easily formed on the electrode due to activation of the carbon atom. Further, it is conceivable that a carbanion produced by deprotonation of active methylene coordinates Li or reacts on the positive electrode to form a film.

In the present invention, it is conceivable that by using a lithium-manganese composite oxide having a spinel structure and adding a material represented by the general formula (1) in an electrolyte solution, a film is formed on the surface of a positive electrode to inhibit decomposition of the electrolyte solution and hinder deposition of resistant materials, and resultantly, an increase in resistance is inhibited and further, elution of manganese is inhibited. It is conceivable that an increase in internal impedance during the end stage of discharge is inhibited by the aforementioned film, and therefore the cycle characteristic is effectively improved.

Specific examples of general formula (1) will be shown below, but the present invention is not limited to these examples.

[Formula 5]

Compound No. 1

[Formula 6]

Compound No. 2

[Formula 7]

Compound No. 3

[Formula 8]

Compound No. 4

[Formula 9]

Compound No. 5

[Formula 10]

Compound No 6

[Formula 11]

Compound No. 7

[Formula 12]

Compound No. 8

[Formula 13]

Compound No. 9

[Formula 14]

Compound No. 10

[Formula 15]

Compound No. 11

[Formula 16]

Compound No. 12

[Formula 17]

Compound No. 13

[Formula 18]

Compound No. 14

[Formula 19]

Compound No. 15

-continued

[Formula 20]

Compound No. 16

[Formula 21]

Compound No. 17

[Formula 22]

Compound No. 18

[Formula 23]

Compound No. 19

[Formula 24]

Compound No. 20

[Formula 25]

[Formula 26]

The compound represented by the general formula (1) is preferably contained in the electrolyte solution in an amount of 0.1% by weight to 5.0% by weight although the content of the compound is not specifically limited. If the content is less than 0.1% by weight, there may be cases where an effect is not sufficiently exhibited for formation of a film on the surface of the electrode by an electrochemical reaction. If the content exceeds 5.0% by weight, not only the compound becomes hard to be dissolved, but also the viscosity of the electrolyte solution may be increased. In the present invention, the compound is more preferably added in an amount of 0.5% by weight to 3.0% by weight so that a more sufficient film effect is obtained.

The compound represented by the general formula (1) may be used alone or in combination of two or more types. If the compound is used in combination of two or more types, the combination is not specifically limited, but it is effective to include at least one compound having an active methylene group (compound in which $R_1$ and $R_4$ are hydrogen) in terms of ease of formation of a film with an electrode. Specific combinations include a combination of the aforementioned compound No. 1 (compound having an active methylene group) and the compound No. 5.

If two or more types of compounds of general formula (1) are added, the ratio of the compounds to the electrolyte solution is not specifically limited, but for a reason same as that described above, the ratio of two types of compounds is preferably in the range of 0.1% by weight to 5.0% by weight. If two or more types of compounds of general formula (1) are added, the ratio of the weight of each compound to the total mass of compounds of general formula (1) is not specifically limited, but preferably, the ratio of a compound in the smallest amount is 5% by weight and the ratio of a compound in the largest amount is 95% by weight.

Further, it is also effective to use an electrolyte solution containing the compound of general formula (1) and containing at least one of cyclic monosulfonates, cyclic sulfonates having two sulfonyl groups, alkane sulfonic anhydrides and sulfolene compounds.

Cyclic monosulfonates include compounds represented by the following general formula (2):

[Formula 27]

wherein n is an integer of 0 to 2; $R_5$ to $R_{10}$ independently represent an atom or a group selected from a hydrogen atom, a substituted or unsubstituted alkyl group having 1 to 12 carbon atoms, a substituted or unsubstituted fluoroalkyl group having 1 to 6 carbon atoms, and a polyfluoroalkyl group having 1 to 6 carbon atoms.

In the compound represented by the general formula (2), n is preferably 0 or 1, and $R_5$ to $R_{10}$ are preferably each independently an atom or a group selected from a hydrogen atom, substituted or unsubstituted alkyl groups having 1 to 12 carbon atoms, and polyfluoroalkyl groups having 1 to 5 carbon atoms, more preferably each independently a hydrogen atom, or a polyfluoroalkyl group having 1 to 5 carbon atoms, in terms of stability of a compound, ease of synthesis of a compound, solubility in a solvent, a price and the like. Further preferably, $R_5$ to $R_{10}$ are all hydrogen atoms, or one or two of $R_5$ to $R_{10}$ are polyfluoroalkyl groups having 1 to 5 carbon atoms, and others are hydrogen atoms. The aforementioned polyfluoroalkyl group having 1 to 5 carbon atoms is preferably a trifluoromethyl group.

Specific examples include 1,3-propanesultone (1,3-PS), α-trifluoromethyl-γ-sultone, β-trifluoromethyl-γ-sultone, γ-trifluoromethyl-γ-sultone, α-methyl-γ-sultone, α,β-di(trifluoromethyl)-γ-sultone, α,α-di(trifluoromethyl)-γ-sultone, α-undecafluoropentyl-γ-sultone, α-heptafluoropropyl-γ-sultone and 1,4-butanesultone (1,4-BS).

Among them, 1,3-propanesultone (1,3-PS) is considered to form a decomposition film on a negative electrode of a lithium ion secondary battery. The LUMO of 1,3-PS is 0.07 eV and greater than the LUMO of the compound No. 1 of the present invention (−0.86 eV). For example, it is conceivable that if the compound No. 1 of the present invention and 1,3-PS are added to the electrolyte solution and the secondary battery is charged, the material of the compound No. 1 first forms a film on the negative electrode and 1,3-PS then forms a film. A certain area on the surface of the negative electrode mainly reacts with the compound No. 1 during the initial stage of charge, but charge at an area which has not reacted with the compound No. 1 (area that is possible to react with solvent molecules) progresses and the area reacts with 1,3-PS, and resultantly, a composite film of the compound No. 1 and 1,3-PS is formed, and an effect of further inhibiting an increase in resistance, inhibition of blistering of the secondary battery, and the like can be expected.

When the compound of general formula (2) is added to the electrolyte solution, the content of the compound in the electrolyte solution is not specifically limited, but the compound is preferably contained in the electrolyte solution in an amount of 0.5% by weight to 10.0% by weight. If the content is less than 0.5% by weight, there may be cases where an effect is not sufficiently exhibited for formation of a film on the surface of the electrode by an electrochemical reaction. If the content exceeds 10.0% by weight, the viscosity of the electrolyte solution may be increased. The ratio of the compound of general formula (2) to the compounds of general formula (1) and general formula (2) is preferably in the range of 10 to 90% by weight based on the total weight of the compound of general formula (1) and the compound of general formula (2).

Cyclic sulfonates having two sulfonyl groups include compounds represented by the following general formula (3):

[Formula 28]

(3)

wherein Q represents an oxygen atom, a methylene group or a single bond, and A represents a group selected from a substituted or unsubstituted alkylene group having 1 to 5 carbon atoms, a carbonyl group, a sulfinyl group, a polyfluoroalkylene group having 1 to 5 carbon atoms, a substituted or unsubstituted fluoroalkylene group having 1 to 5 carbon atoms, a substituted or unsubstituted alkylene group having 1 to 5 carbon atoms in which at least one C—C bond is replaced by a C—O—C bond, a polyfluoroalkylene group having 1 to 5 carbon atoms in which at least one C—C bond is replaced by a C—O—C bond, and a substituted or unsubstituted fluoroalkylene group having 1 to 5 carbon atoms in which at least one C—C bond is replaced by a C—O—C bond; and B represents a group selected from a substituted or unsubstituted alkylene group having 1 to 5 carbon atoms, a polyfluoroalkylene group having 1 to 5 carbon atoms, and a substituted or unsubstituted fluoroalkylene group having 1 to 5 carbon atoms.

As for the compound represented by the general formula (3), A is preferably a group selected from substituted or unsubstituted alkylene groups having 1 to 5 carbon atoms, polyfluoroalkylene groups having 1 to 5 carbon atoms, substituted or unsubstituted fluoroalkylene groups having 1 to 5 carbon atoms, substituted or unsubstituted alkylene groups having 1 to 5 carbon atoms in which at least one C—C bond is replaced by a C—O—C bond, polyfluoroalkylene groups having 1 to 5 carbon atoms in which at least one C—C bond is replaced by a C—O—C bond, and substituted or unsubstituted fluoroalkylene groups having 1 to 5 carbon atoms in which at least one C—C bond is replaced by a C—O—C bond, in terms of stability of a compound, ease of synthesis of a compound, solubility in a solvent, a price and the like. A group selected from substituted or unsubstituted alkylene groups having 1 to 5 carbon atoms, polyfluoroalkylene groups having 1 to 5 carbon atoms, and substituted or unsubstituted fluoroalkylene groups having 1 to 5 carbon atoms is more preferable, a substituted or unsubstituted alkylene group having 1 to 5 carbon atoms is further preferable, and a methylene group, an ethylene group or a 2,2-propanediyl group is especially preferable. The aforementioned fluoroalkylene group having 1 to 5 carbon atoms preferably includes a methylene group and a difluoromethylene group, and more preferably composed of a methylene group and a difluoromethylene group.

For the same reason, B is preferably an alkylene group having 1 to 5 carbon atoms, more preferably a methylene group, a 1,1-ethanediyl group or a 2,2-propanediyl group.

These cyclic sulfonates having two sulfonyl groups are disclosed in U.S. Pat. No. 4,950,768. Specific compounds represented by the general formula (3) are listed below, but the present invention is not limited to these compounds.

[Formula 29]

Compound No. 21

(methylene methane disulfonate: MMDS)

[Formula 30]

Compound No. 22

[Formula 31]

Compound No. 23

-continued

[Formula 32]

Compound No. 24

[Formula 33]

Compound No. 25

[Formula 34]

Compound No. 26

[Formula 35]

Compound No. 27

[Formula 36]

Compound No. 28

[Formula 37]

Compound No. 29

[Formula 38]

Compound No. 30

-continued

[Formula 39]

Compound No. 31

[Formula 40]

Compound No. 32

[Formula 41]

Compound No. 33

[Formula 42]

Compound No. 34

[Formula 43]

Compound No. 35

[Formula 44]

Compound No. 36

[Formula 45]

Compound No. 37

[Formula 46]

Compound No. 38

-continued

[Formula 47]

Compound No. 39

[Formula 48]

Compound No. 40

[Formula 49]

Compound No. 41

[Formula 50]

Compound No. 42

Since these compounds have LUMO at a level same as that of the compound of the general formula (1) of the present invention, and have two or more sulfonyl groups, when, for example, the materials of the compound No. 1 and the compound No. 21 (MMDS) are added to the electrolyte solution, a composite film having a high ion conductivity is easily formed during the initial stage of charge. MMDS is a cyclic compound, which can be considered to easily react with a negative electrode and form a film by opening the ring.

If MMDS rather selectively contributes to formation of a film on the negative electrode, the material of the compound No. 1 has a decreased probability of formation of a film on the negative electrode and has an increased probability of reaction on the positive electrode to achieve formation of a film on the positive electrode. As a result, inhibition of decomposition of the solvent on the positive electrode can be expected.

When the compound of the general formula (3) is added to the electrolyte solution, the content of the compound of the general formula (3) in the electrolyte solution is not specifically limited, but the compound is preferably contained in an amount of 0.5% by weight to 10.0% by weight. If the content is less than 0.5% by weight, there may be cases where an effect is not sufficiently exhibited for formation of a film on the surface of the electrode by an electrochemical reaction. If the content exceeds 10.0% by weight, the viscosity of the electrolyte solution may be increased. The ratio of the compound of the general formula (3) to the compounds of the general formula (1) and the general formula (3) is preferably in the range of 10 to 90% by mass based on the total weight of the compounds of the general formula (1) and the general formula (3). If the compound of the general formula (2) is additionally used, the ratio of the compound is preferably in the range of 10 to 90% by mass based on the total weight of the compounds of the general formula (1), the general formula (2) and the general formula (3).

In the present invention, at least one of vinylene carbonates (VC) and derivatives thereof may be added in the aforementioned electrolyte solution in some cases. By adding at least one of VC and derivatives thereof, the cycle characteristic can further be improved. The VC has LUMO of 0.09 eV and is harder to undergo a reduction reaction than the compound of the general formula (1). It is conceivable that the VC and derivatives thereof exist in the electrolyte solution over a long time period without being consumed by undergoing a reduction reaction during initial charge and discharge. Thus, the VC and derivatives thereof can gradually be consumed during the charge and discharge cycle to contribute to an improvement in cycle characteristic. When at least one of the aforementioned vinylene carbonates and derivatives thereof is used as an additive, an effect is obtained by including the additive in the electrolyte solution in an amount of 0.05% by weight to 3.0% by weight.

When the compound of the general formula (1) and the VC, or the compound of the general formula (1), other additives and further the VC are added to the electrolyte solution, the content of the VC to the entire electrolyte solution is not specifically limited, but is preferably in the range of 0.5% by weight to 10.0% by weight. If the content is less than 0.5% by weight, there may be cases where an effect is not sufficiently exhibited for formation of a film on the surface of the electrode by an electrochemical reaction. If the content exceeds 10.0% by weight, the viscosity of the electrolyte solution may be increased.

The electrolyte solution of the present invention is provided by the adding and dissolving the compound represented by the general formula (1) in an electrolyte solution in advance. By appropriately adding other additive materials (cyclic monosulfonate, cyclic sulfonate having two sulfonyl groups, sulfolane, alkane sulfonic anhydride, sulfolene compound or vinylene carbonate compound) to the electrolyte solution, a desired electrolyte solution can be obtained.

The shape of the secondary battery according to the present invention is not specifically limited, but examples include a cylinder type, a rectangle type, a coin type and a laminate type. Among them, the laminate type has a shape in which the battery is sealed with an exterior package composed of a flexible film consisting of a laminate of a synthetic resin and a metal foil, or the like, and is more susceptible to an increase in internal pressure than a secondary battery enclosed in an exterior package composed of a battery can of cylinder type, rectangle type, coin type or the like, and it is therefore important to control a chemical reaction with an interface between the electrode and the electrolyte solution. The secondary battery containing a chain disulfone compound represented by the general formula (1) according to the present invention can inhibit an increase in resistance and inhibit blistering of the secondary battery (gas generation and increase in internal pressure) although it is a laminate type battery. Thus, it is possible to ensure safety and long-term reliability in a large-scale lithium ion secondary battery for use in an automobile or the like.

The lithium secondary battery according to the present invention is obtained by laminating a negative electrode 13 and a positive electrode 12 via a separator 16 or rolling the laminated electrodes under a dry air or inert gas atmosphere, then inserting the laminated electrodes into an exterior package, impregnating the separator with an electrolyte solution containing a compound represented by the general formula (1), and sealing the battery exterior package. The effect of the present invention can be obtained by forming a film on the electrode by charging the secondary battery before or after sealing.

EXAMPLES

[Manufacturing Process]

First, a lithium-manganese composite oxide having a spinel structure, which plays a role as a positive electrode active material of the present invention, will be described. As long as the lithium-manganese composite oxide has a spinel structure, it is not necessary that [Li]/[Mn] ratio should be 0.5 (i.e. $LiMn_2O_4$), and the ratio of Li may be higher, or Li may be replaced by another element (typically $Li_{1+x}Mn_{2-x}O_4$, x>0).

Similarly, as long as the lithium-manganese composite oxide has a spinel structure, it is not necessary that the [Li+Mn]/[O] ratio should be 0.75.

In consideration of ease of formation of slurry in fabrication of a positive electrode and evenness of a battery reaction, the particle diameter of the lithium-manganese composite oxide is usually 0.5 to 30 μm as a $D_{50}$ particle diameter. This lithium-manganese composite oxide can be produced in a manner that will be described below.

As a Li raw material, for example, lithium compounds such as, lithium carbonate, lithium oxide, lithium nitride and lithium hydroxide may be used, and as a Mn raw material, for example, various kinds of Mn oxides such as electrolytic manganese dioxide (EMD), $Mn_2O_3$, $Mn_3O_4$ and chemical manganese dioxide (CMD), and manganese compounds such as manganese salts such as manganese carbonate and manganese oxalate may be used. However, in consideration of ease of securing a composition ratio of Li and Mn, ease of securing a desired particle diameter, simplicity of process and handling in industrial mass synthesis, presence or absence of a harmful substance generated, costs, and the like, a combination of electrolytic manganese dioxide and lithium carbonate is preferable.

The lithium raw material and the manganese raw material are preferably ground to have a uniform and appropriate particle as a pre-stage for mixing starting raw materials. The particle diameter of the Mn raw material is usually in the range of 1 to 70 μm, preferably 0.5 to 30 μm. The 15 particle diameter of the Li source is usually 10 μm or less, preferably 5 μm or less, most preferably 3 μm or less.

Since a reaction for generation of the lithium-manganese composite oxide proceeds on the solid phase surface, if the mixing of the Li source and the Mn source is insufficient or the particle diameter is too rough, there may be cases where a lithium-manganese composite oxide having a desired composition and structure cannot be obtained. For example, if the mixing of the Li source and the Mn source is insufficient or the particle diameter is too large when producing a lithium-manganese composite oxide having a spinel structure, there may be cases where oxide phases such as $Mn_2O_3$, $Mn_3O_4$, $Li_2MnO_3$, $Li_2Mn_4O_9$ and $Li_4Mn_5O_{12}$ are generated. There may be cases where the battery voltage decreases or the energy density decreases as compared to the lithium-manganese composite oxide having a spinel structure. Thus, for obtaining a lithium-manganese composite oxide having a desired composition and structure, it is preferable that raw materials having the particle diameter described above are used, the area of contact between the Li raw material and the Mn raw material is increased, and evenness of the reaction is improved. Thus, control of the particle diameter or granulation of a mixed powder may be performed. If the particle diameter of the raw material is controlled, a lithium-manganese composite oxide having a desired particle diameter can easily be obtained.

Raw materials are weighed so that the molar ratio of Li/Mn matches a desired composition ratio of the lithium-manganese composite oxide, the weighed raw materials are sufficiently mixed, and the resultant mixture is then baked in an oxygen atmosphere. For the baking atmosphere, pure oxygen may be used, or a mixed gas of an inert gas such as nitrogen or argon and oxygen may be used. The oxygen partial pressure at this time is in the range of about 50 to 760 Torr.

The baking temperature is usually in the range of 400 to 1000° C., but is appropriately selected so as to obtain a desired phase. For example, when a lithium-manganese composite oxide having a spinel structure is produced, there may be cases where undesired phases such as $Mn_2O_3$ and $Li_2MnO_3$ are generated and entrained, and the battery voltage and the energy density become insufficient if the baking temperature is too high. If the baking temperature is too low, there may be cases where oxygen becomes relatively excessive or the powder density decreases, which is not preferable for achieving a high capacity. Thus, when a lithium-manganese composite oxide having a spinel structure is produced, the baking temperature is preferably in the range of 600 to 900° C., most preferably 700 to 850° C.

The baking time can appropriately be adjusted, but is usually in the range of 6 to 100 hours, preferably 12 to 48 hours. The cooling rate can appropriately be adjusted, but rapid cooling is preferably avoided during final baking processing, and the cooling rate is preferably, for example, about 100° C./h or less.

Further, it is desirable to classify the powder of the lithium-manganese composite oxide thus obtained as necessary to make the particle diameter uniform.

Next, a technique for having a compound of Bi elements exist on or near the surface of a spinel type lithium-manganese composite oxide will be described. A compound raw material of Bi elements such as, for example, bismuth hydroxide is mixed with the lithium-manganese composite oxide obtained in the manner described above so as to have a weight ratio of $(Bi_2O_3)/(lithium-manganese$ composite oxide+$[Bi_2O_3])$=0.005 to 0.05, and the resultant mixture is baked and classified to obtain a positive electrode active material of the present invention. The reason for using not the raw material but $Bi_2O_3$ for calculation of the weight ratio is that thermally treated Bi is mainly in a state of $Bi_2O_3$. At the time of synthesis, compound raw materials include hydroxides of Bi elements, nitride compounds and oxides, but hydroxides are preferable.

For improving the effect of improving characteristics, the raw material should be made sufficiently fine as a pretreatment. Specifically, it is desirable that the average particle diameter should be 1 μm or less and the maximum particle diameter should be 3 μm or less. It is also necessary to optimize the baking temperature. If the baking temperature is too low, a partial reaction near the surface of the lithium-manganese composite oxide does not proceed, and the raw material remains in the form of a mixture of the lithium manganese composite oxide and the compound raw material of Bi elements. If the baking temperature is too high, a decomposition reaction of the lithium-manganese composite oxide proceeds to generate $Li_2MnO_3$. $Li_2MnO_3$ is very undesirable because it does not contribute to charge and discharge. Accordingly, the reaction temperature should be in the range of 550° C. to a decomposition reaction temperature of the lithium-manganese composite oxide.

The decomposition reaction temperature varies depending on the molar ratio of Li/Mn, but for one example, it is about 850° C. for Li/Mn=0.5, and about 620° C. for Li/Mn=0.625. In the range described above, the decomposition reaction temperature decreases as the Li/Mn ratio becomes greater.

A spinel type lithium-manganese composite oxide with a compound of Bi elements had to exist on or near the surface of the spinel type lithium-manganese composite oxide at an appropriate baking temperature using an appropriate raw material as in the method described above will be hereinafter abbreviated as "surface treatment spinel". The surface treatment spinel has the following features.

(1) A grating constant of the surface treatment spinel was determined from a general XRD measurement method and Rietveld analysis, and as a result, little change in grating constant was observed. That is, it was found that many Bi elements did not enter into the grating (did not form a solid solution). According to the XRD measurement, however, in addition to the spinel type lithium-manganese composite oxide, a peak of the Bi element oxide and a peak characteristic of a composite oxide of Bi—Mn were found, although very small were observed. It is conceivable that Bi elements do not enter into the grating, but are likely to slightly react with Mn existing near the surface. In any case, the surface treatment spinel was found to have an oxide of Bi elements and a Bi—Mn composite oxide on or near the surface.

(2) The state of distribution of elements was observed by general EDX measurement, and as a result, each element did not locally exist, but were uniformly distributed.

(3) As a result of making a determination from tow points described above, it was presumed that the compound of Bi elements would exist on or near the surface of the spinel type lithium-manganese composite oxide.

(4) The raw material ground to a submicron scale has a large surface area. Accordingly, it is considered that the raw material is uniformly dispersed near the surface of the spinel type lithium-manganese composite oxide and easily undergoes some reaction on the surface.

(5) As a result of evaluation of characteristics, the surface treatment spinel showed characteristics different from the oxide of Bi elements simply mixed with the positive electrode. That is, when a cell is fabricated simply by mixing the oxide of Bi elements with the positive electrode and evaluated, the capacity decreases according to the amount of the oxide mixed, and little change is found in cycle characteristic and the like. In other words, it serves as so called impurities to have no influence on characteristics. Accordingly, it is conceivable that as a result of performing the mixing and thermal treatment, the surface treatment spinel and the oxide of Bi elements simply mixed with the positive electrode are in different crystalline states.

For the positive electrode that is used in the nonaqueous electrolyte solution secondary battery of the present invention, a material obtained by mixing such a surface treatment spinel with a hydrogen ion scavenger in some cases may be used as a positive electrode active material.

(Manufacturing of Secondary Battery)

Positive electrode active materials described in Tables 1 to 3 and an electric conductivity imparting agent were mixed in a dry form, and the resultant mixture was uniformly dispersed in N-methyl-2-pyrolidone (NMP) having dissolved PVDF as a binder to prepare a slurry. For the electric conductivity imparting agent, carbon black was used. The slurry was coated on an aluminum metal foil (25 µm for the laminate type) as a positive electrode current collector, and NMP was then evaporated to obtain a positive electrode sheet. The ratio of solids in the positive electrode was positive electrode active material:electric conductivity imparting agent:PVDF=80:10:10 (% by weight).

If a negative electrode active material is consisted of a carbon material, mixing was carried out so as to obtain a ratio of carbon:PVDF=90:10 (% by weight), the resultant mixture was dispersed in NMP, and the resultant dispersions were coated on a copper foil (20 µm for the laminate type) as a negative electrode current collector 14 to fabricate a sheet.

For an electrolyte solution 15, a solution prepared by dissolving solvents described in Tables 1 to 3, 1 mol/L of $LiPF_6$ as an electrolyte and additives described in Tables 1 to 3 was used.

Thereafter, the negative electrode and the positive electrode were laminated via a separator 16 made of polyethylene to fabricate an aluminum laminate film type secondary battery (Examples 1 to 32). In the case of the aluminum laminate film type secondary battery, a laminate film that was used has a structure in which a polypropylene resin (sealing layer, thickness: 70 µm), polyethylene terephthalate (20 µm), aluminum (50 µm) and polyethylene terephthalate (20 µm) are laminated in this order. This film was cut into two pieces having a predetermined size, a recessed portion having a bottom face part and a side face part corresponding to the size of the aforementioned laminated electrode body was formed on a part of the cut piece, these cut pieces were made to face each other to wrap the aforementio laminated electrode body, and the periphery of laminated electrode body was heat-sealed to fabricate a film packaging battery. The 5 laminated electrode body was impregnated with an electrolyte solution before sealing the last one side by heat sealing.

(Charge and Discharge Cycle Test)

Amorphous carbon was used as a negative electrode active material, a lithium-manganese composite oxide having a spinel structure was used as a positive electrode active material, a charge termination voltage was 4.2 V and a discharge termination voltage was 2.5 V at a charge rate of 1 C and a discharge rate of 1 C. The capacity maintenance rate (%) is a value obtained by dividing a discharge capacity (mAh) after 500 cycles by a discharge capacity (mAh) in the tenth cycle.

(Storage Characteristic Test)

The storage characteristic was measured with a resistance increase rate (the resistance value after storage/the resistance value at the initial stage where the resistance value at the initial stage (at the start of storage) is 1: charge and discharge conditions are same as those of the charge and discharge cycle test described above) after storage for 60 days at a discharge depth of 50% (45° C).

(Charge and Discharge Test)

The upper limit of a voltage allowing charge and discharge to be performed stably was measured by the method in FIG. 2.

TABLE 1

| | Lithium-manganese composite oxide (upper limit voltage allowing charge and discharge to be performed stably: V) | Components added to positive electrode (% by weight) | Negative electrode active material | Type and composition of additives in electrolyte solution (% by weight) | Solvent (volume ratio) | Shape of cell |
|---|---|---|---|---|---|---|
| Example 1 | $Li(Li_{0.01}Mn_{0.99})_2O_4$ 4.23 V | None | Amorphous carbon | No. 1(0.5) | PC/EC/DEC (20/20/60) | Laminate type |
| Example 2 | $Li(Li_{0.05}Mn_{0.95})_2O_4$ 4.17 V | None | Amorphous carbon | No. 1(0.5) | PC/EC/DEC (20/20/60) | Laminate type |
| Example 3 | $Li(Li_{0.07}Mn_{0.93})_2O_4$ 4.19 V | None | Amorphous carbon | No. 1(0.5) | PC/EC/DEC (20/20/60) | Laminate type |
| Example 4 | $Li(Li_{0.08}Mn_{0.92})_2O_4$ 4.23 V | None | Amorphous carbon | No. 1(0.5) | PC/EC/DEC (20/20/60) | Laminate type |
| Example 5 | $Li(Li_{0.1}Mn_{0.9})_2O_4$ 4.20 V | None | Amorphous carbon | No. 1(0.5) | PC/EC/DEC (20/20/60) | Laminate type |
| Example 6 | $Li(Mg_{0.05}Mn_{0.95})_2O_4$ 4.22 V | None | Amorphous carbon | No. 1(0.5) | PC/EC/DEC (20/20/60) | Laminate type |
| Example 7 | $Li(Al_{0.05}Mn_{0.95})_2O_4$ 4.23 V | None | Amorphous carbon | No. 1(0.5) | PC/EC/DEC (20/20/60) | Laminate type |
| Comparative Example 1 | $Li(Li_{0.08}Mn_{0.92})_2O_4$ 4.23 V | None | Amorphous carbon | None | PC/EC/DEC (20/20/60) | Laminate type |
| Example 8 | $Li(Li_{0.2}Mn_{0.8})_2O_4$ 4.19 V | None | Amorphous carbon | No. 1(0.5) | PC/EC/DEC (20/20/60) | Laminate type |
| Example 9 | $Li(Li_{0.08}Mn_{0.92})_2O_4$ 4.23 V | None | Amorphous carbon | No. 1(0.5) + 1% 1,3-PS | PC/EC/DEC (20/20/60) | Laminate type |
| Example 10 | $Li(Li_{0.08}Mn_{0.92})_2O_4$ 4.23 V | $Li(Ni_{0.8}Co_{0.2})O_2$ (5) Hydrogen ion scavenger | Amorphous carbon | No. 1(0.5) | PC/EC/DEC (20/20/60) | Laminate type |
| Example 11 | $Li(Li_{0.8}Mn_{0.92})_2O_4$ 4.23 V | $Li(Ni_{0.8}Co_{0.2})O_2$ (10) Hydrogen ion scavenger | Amorphous carbon | No. 1(0.5) | PC/EC/DEC (20/20/60) | Laminate type |
| Example 12 | $Li(Li_{0.08}Mn_{0.92})_2O_4$ 4.23 V | $Li(Ni_{0.8}Co_{0.2})O_2$ (15) Hydrogen ion scavenger | Amorphous carbon | No. 1(0.5) | PC/EC/DEC (20/20/60) | Laminate type |

TABLE 2

| | Lithium-manganese composite oxide (upper limit voltage allowing charge and discharge to be performed stably: V) | Components added to positive electrode (% by weight) | Negative electrode active material | Type and composition of additives in electrolyte solution (% by weight) | Solvent (volume ratio) | Shape of cell |
|---|---|---|---|---|---|---|
| Example 13 | $Li(Li_{0.08}Mn_{0.92})_2O_4$ 4.23 V | $Li(Ni_{0.8}Co_{0.2})O_2$ (25) Hydrogen ion scavenger | Amorphous carbon | No. 1(0.5) | PC/EC/DEC (20/20/60) | Laminate type |
| Example 14 | $Li(Li_{0.08}Mn_{0.92})_2O_4$ 4.23 V | $Li(Ni_{0.8}Co_{0.2})O_2$ (30) Hydrogen ion scavenger | Amorphous carbon | No. 1(0.5) | PC/EC/DEC (20/20/60) | Laminate type |
| Example 15 | $Li(Li_{0.08}Mn_{0.92})_2O_4$ 4.23 V | $Li(Ni_{0.8}Co_{0.2})O_2$ (35) Hydrogen ion scavenger | Amorphous carbon | No. 1(0.5) | PC/EC/DEC (20/20/60) | Laminate type |
| Comparative Example 2 | $Li(Li_{0.08}Mn_{0.92})_2O_4$ 4.23 V | $Li(Ni_{0.8}Co_{0.2})O_2$ (25) Hydrogen ion scavenger | Amorphous carbon | None | PC/EC/DEC (20/20/60) | Laminate type |
| Example 16 | $Li(Li_{0.08}Mn_{0.92})_2O_4$ 4.23 V | $Li(Ni_{1/3}Co_{1/3}Mn_{1/3})O_2$ (40) | Amorphous carbon | No. 1(0.5) | PC/EC/DEC (20/20/60) | Laminate type |
| Comparative Example 3 | $Li(Li_{0.08}Mn_{0.92})_2O_4$ 4.23 V | $Li(Ni_{1/3}Co_{1/3}Mn_{1/3})O_2$ (40) | Amorphous carbon | None | PC/EC/DEC (20/20/60) | Laminate type |
| Example 17 | $Li(Li_{0.08}Mn_{0.92})_2O_4$ 4.23 V | $Bi_2O_3$ (2) Bismuth compound | Amorphous carbon | No. 1(0.5) | PC/EC/DEC (20/20/60) | Laminate type |
| Example 18 | $Li(Li_{0.08}Mn_{0.92})_2O_4$ 4.23 V | $BiMnO_3$ (2) Bismuth compound | Amorphous carbon | No. 1(0.5) | PC/EC/DEC (20/20/60) | Laminate type |
| Example 19 | $Li(Li_{0.08}Mn_{0.92})_2O_4$ 4.23 V | $Bi_2O_3$ (2) Bismuth compound $Li(Ni_{0.8}Co_{0.2})O_2$ (25) Hydrogen ion scavenger | Amorphous carbon | No. 1(0.5) | PC/EC/DEC (20/20/60) | Laminate type |
| Comparative Example 4 | $Li(Li_{0.08}Mn_{0.92})_2O_4$ 4.23 V | $Bi_2O_3$ (2) Bismuth compound $Li(Ni_{0.8}Co_{0.2})O_2$ (25) Hydrogen ion scavenger | Amorphous carbon | None | PC/EC/DEC (20/20/60) | Laminate type |
| Example 20 | $Li(Li_{0.08}Mn_{0.92})_2O_4$ 4.23 V | $Li(Ni_{0.8}Co_{0.2})O_2$ (25) Hydrogen ion scavenger | Amorphous carbon | No. 1(0.5) + 1% 1,3-PS | PC/EC/DEC (20/20/60) | Laminate type |
| Example 21 | $Li(Li_{0.08}Mn_{0.92})_2O_4$ 4.23 V | $Li(Ni_{0.8}Co_{0.2})O_2$ (25) Hydrogen ion scavenger | Amorphous carbon | No. 1(0.5) + 1% 1,3-PS + 1% VC | PC/EC/DEC (20/20/60) | Laminate type |
| Example 22 | $Li(Li_{0.08}Mn_{0.92})_2O_4$ 4.23 V | $Li(Ni_{1/3}Co_{1/3}Mn_{1/3})O_2$ (40) | Amorphous carbon | No. 1(0.5) + 1% 1,3-PS | PC/EC/DEC (20/20/60) | Laminate type |
| Example 23 | $Li(Li_{0.08}Mn_{0.92})_2O_4$ 4.23 V | $Li(Ni_{1/3}Co_{1/3}Mn_{1/3})O_2$ (40) | Amorphous carbon | No. 1(0.5) + 1% 1,3-PS + 1% VC | PC/EC/DEC (20/20/60) | Laminate type |

TABLE 3

| | Lithium-manganese composite oxide (upper limit voltage allowing charge and discharge to be performed stably: V) | Components added to positive electrode (% by weight) | Negative electrode active material | Type and composition of additives in electrolyte solution (% by weight) | Solvent (volume ratio) | Shape of cell |
|---|---|---|---|---|---|---|
| Example 24 | Li(Li$_{0.08}$Mn$_{0.92}$)$_2$O$_4$ 4.23 V | Li(Ni$_{0.8}$Co$_{0.2}$)O$_2$ (25) Hydrogen ion scavenger | Amorphous carbon | No. 1(0.5) + 1% MMDS | PC/EC/DEC (20/20/60) | Laminate type |
| Example 25 | Li(Li$_{0.08}$Mn$_{0.92}$)$_2$O$_4$ 4.23 V | Li(Ni$_{1/3}$Co$_{1/3}$Mn$_{1/3}$)O$_2$ (40) | Amorphous carbon | No. 1(0.5) + 1% MMDS | PC/EC/DEC (20/20/60) | Laminate type |
| Example 26 | Li(Li$_{0.08}$Mn$_{0.92}$)$_2$O$_4$ 4.23 V | Li(Ni$_{0.8}$Co$_{0.2}$)O$_2$ (25) Hydrogen ion scavenger | Amorphous carbon | No. 1(0.01) | PC/EC/DEC (20/20/60) | Laminate type |
| Example 27 | Li(Li$_{0.08}$Mn$_{0.92}$)$_2$O$_4$ 4.23 V | Li(Ni$_{0.8}$Co$_{0.2}$)O$_2$ (25) Hydrogen ion scavenger | Amorphous carbon | No. 1(0.05) | PC/EC/DEC (20/20/60) | Laminate type |
| Example 28 | Li(Li$_{0.08}$Mn$_{0.92}$)$_2$O$_4$ 4.23 V | Li(Ni$_{0.8}$Co$_{0.2}$)O$_2$ (25) Hydrogen ion scavenger | Amorphous carbon | No. 1(0.1) | PC/EC/DEC (20/20/60) | Laminate type |
| Example 29 | Li(Li$_{0.08}$Mn$_{0.92}$)$_2$O$_4$ 4.23 V | Li(Ni$_{0.8}$Co$_{0.2}$)O$_2$ (25) Hydrogen ion scavenger | Amorphous carbon | No. 1(1.0) | PC/EC/DEC (20/20/60) | Laminate type |
| Example 30 | Li(Li$_{0.08}$Mn$_{0.92}$)$_2$O$_4$ 4.23 V | Li(Ni$_{0.8}$Co$_{0.2}$)O$_2$ (25) Hydrogen ion scavenger | Amorphous carbon | No. 1(3.0) | PC/EC/DEC (20/20/60) | Laminate type |
| Example 31 | Li(Li$_{0.08}$Mn$_{0.92}$)$_2$O$_4$ 4.23 V | Li(Ni$_{0.8}$Co$_{0.2}$)O$_2$ (25) Hydrogen ion scavenger | Amorphous carbon | No. 1(5.0) | PC/EC/DEC (20/20/60) | Laminate type |
| Example 32 | Li(Li$_{0.08}$Mn$_{0.92}$)$_2$O$_4$ 4.23 V | Li(Ni$_{0.8}$Co$_{0.2}$)O$_2$ (25) Hydrogen ion scavenger | Amorphous carbon | No. 1(10.0) | PC/EC/DEC (20/20/60) | Laminate type |
| Example 33 | Li(Li$_{0.08}$Mn$_{0.92}$)$_2$O$_4$ 4.23 V | Li(Ni$_{0.8}$Co$_{0.2}$)O$_2$ (25) Hydrogen ion scavenger | Amorphous carbon | No. 1(12.5) | PC/EC/DEC (20/20/60) | Laminate type |

The "No." described in the column of "type and composition of additives in electrolyte solution" in Tables 1-3 refers to compound No. The voltage described under the positive electrode active material refers to the upper limit of a voltage allowing stable charge and discharge by the aforementioned charge and discharge test. The content of each added component described in the column of "components of added to positive electrode" refers to the weight ratio to the total weight of the positive electrode.

The results obtained by the cycle test and the storage test are shown in Tables 4 to 6 below. The resistance increase rate in the storage characteristic is a relative value where the initial value is 1.

TABLE 4

| | Capacity maintenance rate (%) -500 cycle | Storage characteristic (resistance increase rate) |
|---|---|---|
| Example 1 | 90.2 | 1.078 |
| Example 2 | 90.3 | 1.065 |
| Example 3 | 90.4 | 1.067 |
| Example 4 | 90.8 | 1.051 |
| Example 5 | 90.4 | 1.064 |
| Example 6 | 90.3 | 1.070 |
| Example 7 | 90.3 | 1.069 |
| Comparative Example 1 | 76.5 | 1.512 |
| Example 8 | 89.9 | 1.069 |
| Example 9 | 91.6 | 1.064 |
| Example 10 | 91.3 | 1.077 |
| Example 11 | 92.4 | 1.050 |
| Example 12 | 92.7 | 1.049 |

TABLE 5

| | Capacity maintenance rate (%) -500 cycle | Storage characteristic (resistance increase rate) |
|---|---|---|
| Example 13 | 93.0 | 1.045 |
| Example 14 | 91.2 | 1.074 |
| Example 15 | 91.0 | 1.073 |
| Comparative Example 2 | 78.2 | 1.413 |
| Example 16 | 90.8 | 1.078 |
| Comparative Example 3 | 78.2 | 1.501 |
| Example 17 | 91.5 | 1.072 |
| Example 18 | 91.3 | 1.081 |
| Example 19 | 93.7 | 1.043 |
| Comparative Example 4 | 78.9 | 1.486 |
| Example 20 | 93.9 | 1.044 |
| Example 21 | 94.3 | 1.040 |
| Example 22 | 92.0 | 1.049 |
| Example 23 | 92.7 | 1.050 |

TABLE 6

| | Capacity maintenance rate (%) -500 cycle | Storage characteristic (resistance increase rate) |
|---|---|---|
| Example 24 | 93.9 | 1.045 |
| Example 25 | 92.7 | 1.051 |
| Example 26 | 83.2 | 1.189 |
| Example 27 | 83.9 | 1.196 |
| Example 28 | 92.6 | 1.054 |
| Example 29 | 92.8 | 1.051 |
| Example 30 | 92.0 | 1.061 |
| Example 31 | 91.9 | 1.069 |
| Example 32 | 86.3 | 1.123 |
| Example 33 | 86.9 | 1.119 |

TABLE 7

| | Capacity maintenance rate (%) -500 cycle | Initial discharge capacity (mAh) |
|---|---|---|
| Example 4 | 90.8 | 850 |
| Example 16 | 90.8 | 1050 |
| Comparative Example 3 | 90.1 | 1050 |

TABLE 8

|  | Capacity maintenance rate (%) -500 cycle | Amount of change in cell volume ($\times 10^{-6}$ m$^3$) |
|---|---|---|
| Comparative Example 1 | 76.5 | 0.32 |
| Example 13 | 93.0 | 0.20 |
| Example 16 | 90.8 | 0.23 |
| Example 20 | 93.9 | 0.17 |
| Example 22 | 92.0 | 0.16 |
| Example 24 | 93.9 | 0.19 |
| Example 25 | 92.7 | 0.18 |

(Method for Evaluation of Laminate Film Type Secondary Battery)

This evaluation was made on a laminate film type secondary battery. The secondary battery was charged to a termination voltage of 4.3 V for 5 hours at a constant current of 2 A and constant voltage at room temperature (25° C.), and then discharged to a termination voltage of 2.5 V under a constant current of 2 A, and then a generated gas was removed to measure the volume of the secondary battery at this time. The battery was left standing for a week after being degassed, and then charged and discharged once again at room temperature. The charge current and discharge current at this time were constant (2 A), and the discharge capacity at this time was determined as an initial discharge capacity. The cutoff electric potential on the discharge side was 2.5 V and the cutoff electric potential on the charge side was 4.3 V. Thereafter, the secondary battery was charged to 4.2 V at a constant current of 2 A and constant voltage for 2.5 hours, then discharged to 50% of discharge depth, and left standing at 55° C. for 84 days. After the secondary battery was left standing, a discharge operation was performed again at a constant current at room temperature, charge and discharge was subsequently performed once again at a constant current, the volume of the secondary battery was measured, and a difference between the measured volume and the volume just after the aforementioned removal of a gas was determined as the amount of change in cell volume.

(Effect of Addition of Compound Represented by the General Formula (1))

The capacity maintenance rates in Examples 1 to 8 are much greater than the capacity maintenance rate of Comparative Example 1. It is conceivable that this is because the additives of the present invention inhibited a degradation in cycle characteristic resulting from elution of Mn in the lithium-manganese composite oxide having a spinel structure with a Mn site (16d site from a crystallographic point of view) substituted with an optimized amount of other elements. In addition, it is conceivable that this is because an irreversible reaction is inhibited by stabilization of a surface film existing at an interface between the surface of the positive electrode and negative electrode and the electrolyte and the high ion conductivity of the film by the additives of the present invention.

Further, for the secondary battery shown in Example 4, the surface of the positive electrode and negative electrode after a cycle was examined using X-ray photoelectron spectroscopy (XPS) and energy dispersive X-ray spectroscopy (EDX), and as a result, presence of LiF and LiCO$_3$ was shown. As a result of performing peak division of a sulfur spectral by XPS analysis, presence of a material having a peak around 164 eV was confirmed. A material having a peak around 164 eV is not present in a system having no additives or a system using other additives, and it is thus conceivable that a unique film associated with addition of the compound No. 1 was formed.

As shown in Table 7, the capacity maintenance rate and the initial discharge capacity after the cycle test in Example 16 are greater than those in Example 4. This is ascribable to the effect of LiNi$_{1/3}$Co$_{1/3}$Mn$_{1/3}$O$_3$ added as an active material in the positive electrode.

The capacity maintenance rates after the cycle test in Example 17 and Example 18 were greater than the capacity maintenance rate in Example 4. The capacity maintenance rate after the cycle test in Example 19 was greater than the capacity maintenance rates in Example 17 and Example 18. It is conceivable that this is because a bismuth compound exists on or near the surface while characteristics of various additives and the like are exploited, whereby elution of Mn of the lithium-manganese composite oxide having a spinel structure is inhibited.

(Effect by Addition of Hydrogen Ion Scavenger)

The capacity maintenance rates after the cycle test in Examples 10 to 15 are greater than the capacity maintenance rate in Example 4. It is conceivable that this is because elution of Mn of the lithium-manganese composite oxide having a spinel structure is inhibited by addition of the hydrogen ion scavenger. The cycle test was conducted while changing the concentration of the hydrogen ion scavenger in the positive electrode in Examples 10 to 15, and as a result, high capacity maintenance rates and low resistance increase rates were shown in Examples 11 to 13. From this result, it has been confirmed that the concentration of the hydrogen ion scavenger in the positive electrode is preferably in the range of 10% by weight to 25% by weight.

(Effect of Change in Concentration of Compound of General Formula (1) in Electrolyte Solution)

In Examples 26 to 33, laminate type secondary batteries similar to that of Example 13 were fabricated while changing the concentration of the compound No. 1 in the electrolyte solution, and evaluations were made. The capacity maintenance rate after 500 cycles decreased at a concentration less than 0.1% by weight and at a concentration more than 5.0% by weight. It was found that the resistance increase rate after 60 days of storage extremely increased at a concentration less than 0.1% by weight and a concentration more than 5.0% by weight. From this result, it has been confirmed that the concentration of the compound of the general formula (1) in the electrolyte solution is preferably in the range of 0.1% by weight to 5.0% by weight, especially preferably 0.5% by weight to 3.0% by weight.

(Effect of Addition of Cyclic Monosulfonate)

The amounts of change in cell volume in Examples 20 and 22 are smaller than those in Comparative Example 1, Example 13 and Example 16. It is conceivable that this is because a film was formed on the negative electrode due to a combined effect of the compound represented by the general formula (1) and 1,3-PS, thus making it possible to considerably inhibit decomposition of the electrolyte solution and generation of a gas resulting therefrom. Furthermore, this is ascribable to inhibition of an irreversible reaction due to the high ion conductivity of the film.

(Effect of Addition of Cyclic Disulfonate)

The capacity maintenance rates and the resistance increase rates after 500 cycles in Example 24 and Example 25 are further improved as compared to those in Example 13 and Example 16. It is conceivable that the reason why these results were obtained is that a film having high ion conductivity and high stability was formed during storage as compared to a system with no additives or a system with conventional additives, by adding the compound of the present invention represented by the general formula (1) and the cyclic disulfonate (cyclic sulfonate having two sulfonyl groups) in the electrolyte solution.

(Verification of Effect of Addition of VC)

Cells in Example 21 and Example 23 have further improved cycle characteristics as compared to those in Example 20 and Example 22, respectively. It is conceivable that this is because these results were obtained is that a film having high ion conductivity and high stability was formed during storage and the charge and discharge cycle as compared to a system with no additives or a system with conventional additives, by adding the compound of the present invention represented by the general formula

The invention claimed is:

1. A secondary battery comprising:
   a positive electrode;
   a negative electrode; and
   an electrolyte solution comprising an aprotic solvent having at least an electrolyte dissolved therein,
   wherein the positive electrode comprises a lithium-manganese composite oxide having a spinel structure as a positive electrode active material, and
   the electrolyte solution comprises a compound represented by the general formula (1):

[Formula 1]

(1)

wherein $R_1$ and $R_4$ independently represent an atom or a group selected from a hydrogen atom, a substituted alkyl group having 1 to 5 carbon atoms, a substituted or unsubstituted alkoxy group having 1 to 5 carbon atoms, a substituted or unsubstituted fluoroalkyl group having 1 to 5 carbon atoms, a polyfluoroalkyl group having 1 to 5 carbon atoms, $—SO_2X_1$, wherein $X_1$ is a substituted or unsubstituted alkyl group having 1 to 5 carbon atoms, $—SY_1$, wherein $Y_1$ is a substituted or unsubstituted alkyl group having 1 to 5 carbon atoms, $—COZ$, wherein Z is a hydrogen atom or a substituted or unsubstituted alkyl group having 1 to 5 carbon atoms, and a halogen atom; and $R_2$ and $R_3$ independently represent an atom or a group selected from the group consisting of an unsubstituted alkyl group having 1 to 5 carbon atoms, a substituted or unsubstituted alkoxy group having 1 to 5 carbon atoms, a substituted or unsubstituted phenoxy group, a substituted or unsubstituted fluoroalkyl group having 1 to 5 carbon atoms, a substituted or unsubstituted fluoroalkoxy group having 1 to 5 carbon atoms, a polyfluoroalkoxy group having 1 to 5 carbon atoms, a hydroxyl group, a halogen atom, $—NX_2X_3$, wherein $X_2$ and $X_3$ represent a hydrogen atom, and $—NY_2CONY_3Y_4$, wherein $Y_2$ to $Y_4$ independently represent a hydrogen atom or a substituted or unsubstituted alkyl group having 1 to 5 carbon atoms,
   wherein the compound represented by the general formula (1) is contained in the electrolyte solution in an amount of 0.1 to 5.0% by weight based on a total weight of the electrolyte solution.

2. The secondary battery according to claim 1, wherein the lithium-manganese composite oxide having a spinel structure is Li $(M_xMn_{1-x})_2(O_{1-y}F_y)_4$ ($0 \leq x \leq 0.118$ and $0 \leq y \leq 0.1$), wherein M is at least one element selected from the group consisting of Li, B, Na, Mg, Al, Si, S, K, Ca, Sc, Ti, V, Cr, Fe, Co, Ni, Cu, Zn, Ga, Sr, Y, Zr, Nb, In, Sn, Ba, La, Ce, Nd, Sm, Ta and Pb.

3. The secondary battery according to claim 2, wherein the electrolyte solution has a composition that can produce hydrogen ions by reacting with water, and a hydrogen ion scavenger is placed at a location in contact with the electrolyte solution in the secondary battery.

4. The secondary battery according to claim 1, wherein the electrolyte solution has a composition that can produce hydrogen ions by reacting with water, and a hydrogen ion scavenger is placed at a location in contact with the electrolyte solution in the secondary battery.

5. The secondary battery according to claim 3, wherein the hydrogen ion scavenger is a lithium-nickel composite oxide having a hydrogen ion scavenging function, and is mixed with the positive electrode.

6. The secondary battery according to claim 5, wherein the lithium-nickel composite oxide having a hydrogen ion scavenging function has a specific surface area $X_a$ ($m^2/g$) of $0.1 \leq X_a \leq 3.0$.

7. The secondary battery according to claim 5, wherein the lithium-nickel composite oxide having a hydrogen ion scavenging function has a $D_{50}$ particle diameter of 1 μm to 40 μm.

8. The secondary battery according to claim 5, wherein a is $3 < a \leq 45$ when a weight ratio of the lithium-manganese composite oxide having a spinel structure to the lithium-nickel composite oxide is represented by [lithium-manganese composite oxide having a spinel structure]:[lithium-nickel composite oxide]=(100−a):a.

9. The secondary battery according to claim 1, wherein the positive electrode is further mixed with Li(Ni$_b$Co$_c$Mn$_{1-b-c}$)O$_2$, wherein b is $0 \leq b \leq 2/3$ and c is $0 \leq c \leq 2/3$, provided that $b+c \leq 2/3$).

10. The secondary battery according to claim 9, wherein d is $3 < d \leq 45$ when a weight ratio of the lithium-manganese composite oxide having a spinel structure to the Li(Ni$_b$Co$_c$Mn$_{1-b-c}$)O$_2$ is represented by [lithium-manganese composite oxide having a spinel structure]:[Li(Ni$_b$Co$_c$Mn$_{1-b-c}$)O$_2$]=(100−d):d.

11. The secondary battery according to claim 1, wherein there is a bismuth compound on or near the surface of the lithium-manganese composite oxide having a spinel structure.

12. The secondary battery according to claim 11, wherein the bismuth compound is a bismuth oxide or a composite oxide of bismuth and manganese.

13. The secondary battery according to claim 1, wherein the electrolyte solution further comprises a cyclic monosulfonate represented by the general formula (2):

[Formula 2]

(2)

wherein n is an integer of 0 to 2; $R_5$ to $R_{10}$ independently represent an atom or a group selected from a hydrogen atom, a substituted or unsubstituted alkyl group having 1 to 12 carbon atoms, a substituted or unsubstituted fluoroalkyl group having 1 to 6 carbon atoms, and a polyfluoroalkyl group having 1 to 6 carbon atoms.

14. The secondary battery according to claim 1, wherein the electrolyte solution further comprises a cyclic sulfonate having two sulfonyl groups represented by the general formula (3):

[Formula 3]

(3)

wherein Q represents an oxygen atom, a methylene group or a single bond, and A represents a group selected from a substituted or unsubstituted alkylene group having 1 to 5 carbon atoms, a carbonyl group, a sulfinyl group, a polyfluoroalkylene group having 1 to 5 carbon atoms, a substituted or unsubstituted fluoroalkylene group having 1 to 5 carbon atoms, a substituted or unsubstituted alkylene group having 1 to 5 carbon atoms in which at least one C—C bond is replaced by a C—O—C bond, a polyfluoroalkylene group having 1 to 5 carbon atoms in which at least one C—C bond is replaced by a C—O—C bond, and a substituted or unsubstituted fluoroalkylene group having 1 to 5 carbon atoms in which at least one C—C bond is replaced by a C—O—C bond; and B represents a group selected from a substituted or unsubstituted alkylene group having 1 to 5 carbon atoms, a polyfluoroalkylene group having 1 to 5 carbon atoms, and a substituted or unsubstituted fluoroalkylene group having 1 to 5 carbon atoms.

15. The secondary battery according to claim 1, wherein the electrolyte solution further comprises at least one of vinylene carbonates and derivatives thereof.

16. The secondary battery according to claim 1, wherein the electrolyte comprises a lithium salt.

17. The secondary battery according to claim 16, wherein the lithium salt is at least one lithium salt selected from the group consisting of $LiPF_6$, $LiBF_4$, $LiAsF_6$, $LiSbF_6$, $LiClO_4$, $LiAlCl_4$ and $LiN(C_kF_{2k+1}SO_2)(C_mF_{2m+1}SO_2)$, wherein k and m are independently 1 or 2.

18. The secondary battery according to claim 1, wherein the aprotic solvent is at least one organic solvent selected from the group consisting of cyclic carbonates, chain carbonates, aliphatic carboxylates, γ-lactones, cyclic ethers, chain ethers and fluorinated derivatives thereof.

19. The secondary battery according to claim 1, wherein the secondary battery is covered with a laminated exterior package.

* * * * *